Sept. 2, 1969     T. J. BRIDGES     3,465,358
Q-SWITCHED MOLECULAR LASER
Filed July 21, 1966     3 Sheets-Sheet 1
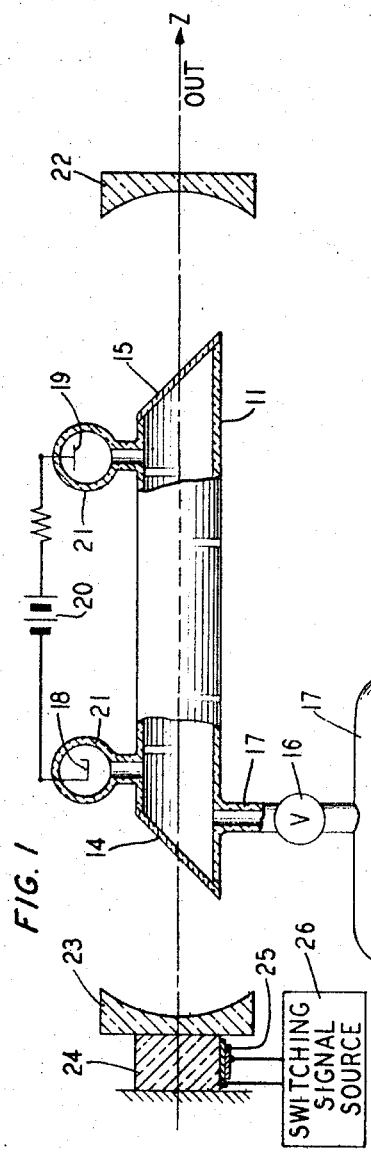
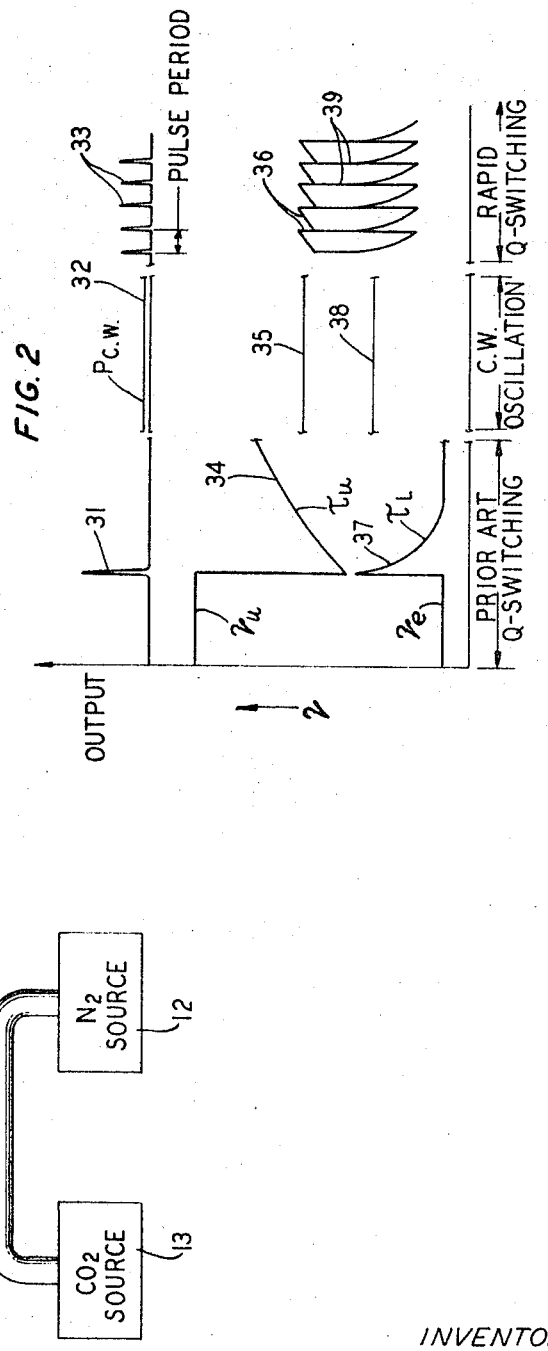
INVENTOR
T. J. BRIDGES
BY Wilford L. Wisner
ATTORNEY

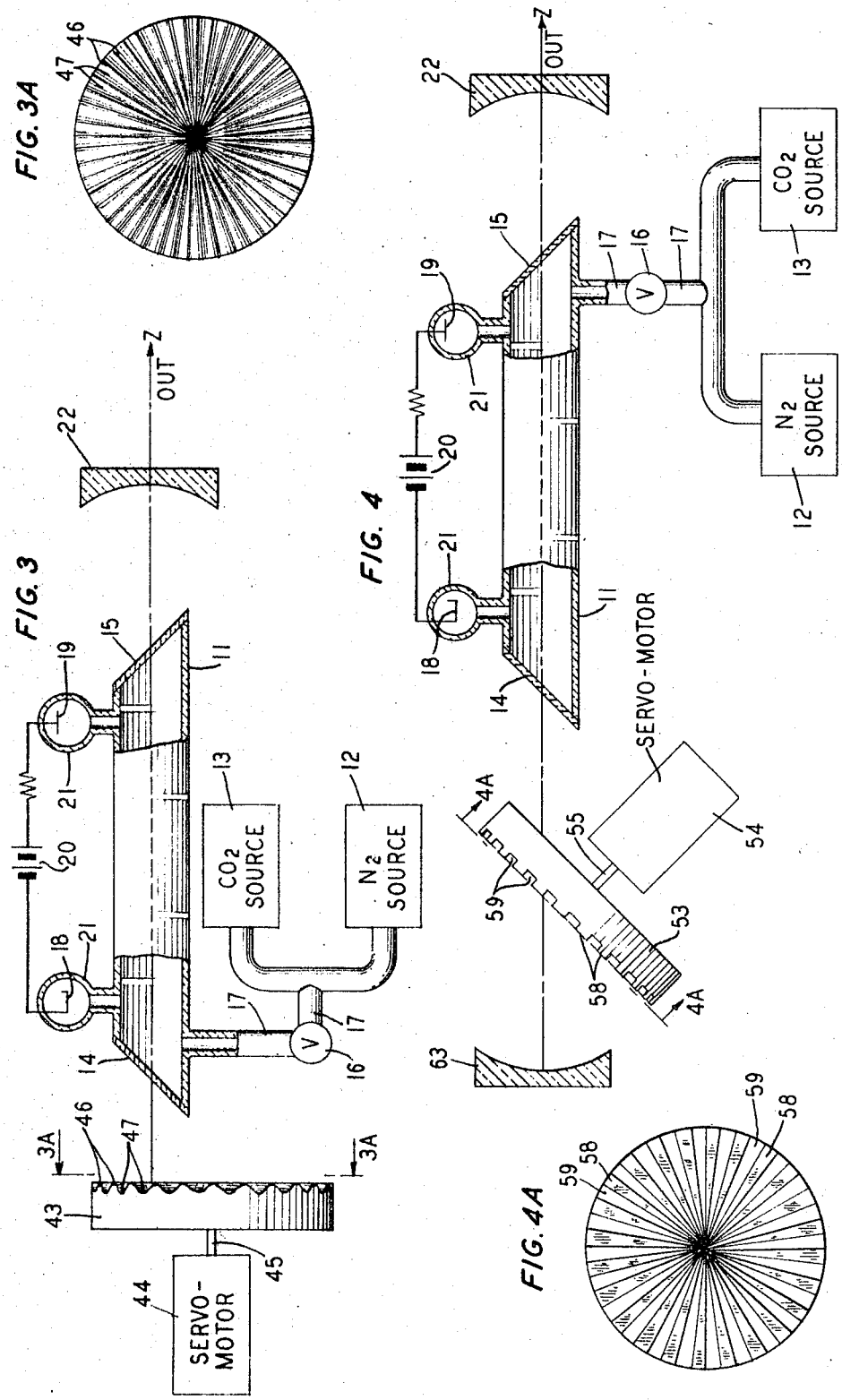

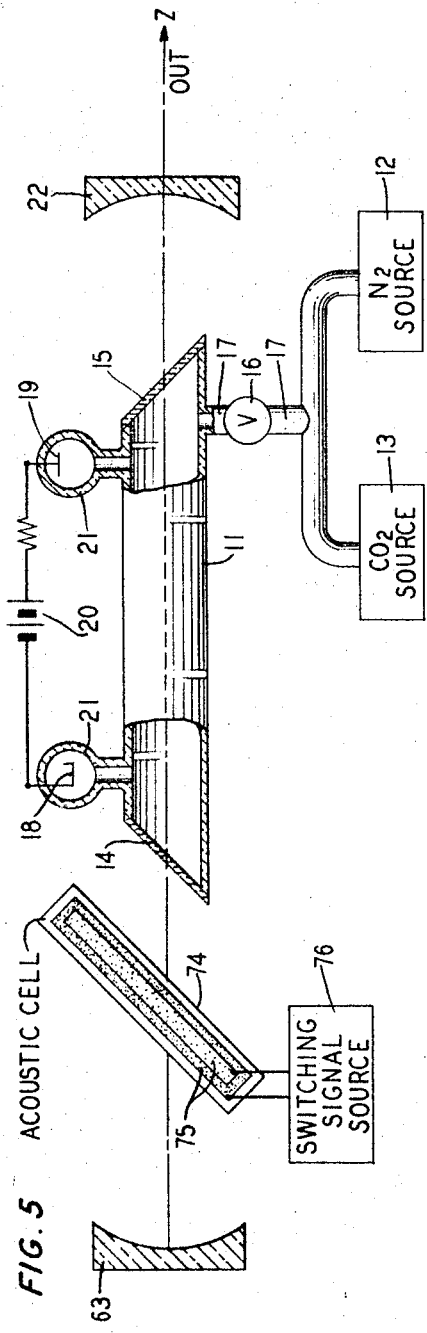
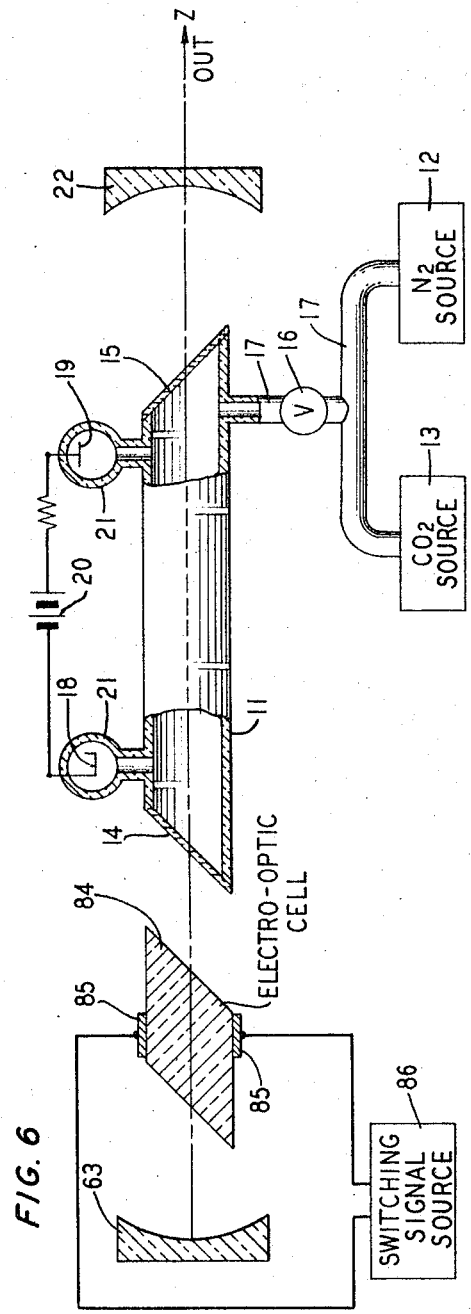

_United States Patent Office_

3,465,358
Patented Sept. 2, 1969

3,465,358
Q-SWITCHED MOLECULAR LASER
Thomas J. Bridges, Bernardsville, N.J., assignor to Bell
Telephone Laboratories, Incorporated, Murray Hill and
Berkeley Heights, N.J., a corporation of New York
Filed July 21, 1966, Ser. No. 566,892
Int. Cl. H01s 3/22, 3/05
U.S. Cl. 331—94.5       10 Claims This invention relates to pulse generation in lasers, particularly in molecular gas lasers.

One common form of pulse generation in solid state lasers is known as Q-switching and involves a perturbation of a condition of the resonant cavity such that the cavity Q, or resonating capability, suddenly increases at the moment a pulse is to be initiated. This form of pulse generation typically requires a lifetime of members of the upper laser level sufficiently long, i.e., $1 \times 10^{-5}$ seconds or longer, that useful amounts of energy can be added to and stored in the laser medium during that lifetime.

Because many of the well-known gas lasers employing atomic transitions had lifetimes of the upper laser level of the order of $1 \times 10^{-7}$ seconds, Q-switching of a gas laser previously did not appear to be useful. Nevertheless, it has recently been recognized that the lifetimes of the upper laser levels in molecular lasers, such as a carbon dioxide laser operating upon a vibrational-rotational transition, are long enough to permit effective Q-switching. It has been suggested in the literature that the rate of Q-switching such a laser is limited so that the pulse period is not substantially shorter than the lifetime of the upper laser state.

For many applications, a more rapid rate of pulsing is desirable. For example, the information-carrying capacity of an optical pulse code modulation system is limited by the rate at which pulsing of the laser radiation can be accomplished.

Other techniques for achieving high pulse repetition rates in other types of lasers have been proposed. One such technique employs a saturable attenuation in the resonator of a suitable laser, as disclosed in the copending application of W. W. Rigrod, Ser. No. 487,974, filed Sept. 17, 1965 and assigned to the assignee hereof. The pulsing produced thereby differs from a Q-switched pulsing, which produces modes having no particular ordering, in that the modes produced are coupled so that they have the equal frequency spacing characteristic of synchronous loss modulation; yet no external modulating signal is required. In addition, the many arrangements that have been proposed for synchronous loss modulation of atomic gas lasers produce more rapid pulsing than can be produced by Q-switching of molecular gas lasers at a rate limited by the lifetime of the upper laser level. Nevertheless, the above-mentioned rapid pulsing techniques cannot readily be applied to a molecular gas laser because typically only one mode oscillates in each of several laser lines; and locking of oscillating modes from diffierent laser lines cannot readily be achieved because of their wide and somewhat irregular frequency spacing.

An object of my invention is to increase the rate of pulsing obtainable from a laser operating upon vibrational-rotational radiative transitions in a molecular gaseous medium.

I have discovered that the rate of Q-switching of such a laser is not limited by the lifetime of the upper laser lever. In particular, I have achieved Q-switching of such a laser in a discrete range of higher pulse frequencies. The periods of these pulses range from a period somewhat shorter than the lifetime of the lower laser level to a period somewhat longer than the lifetime of the lower laser level. The lifetime of the lower laser level in such a system is typically two orders of magnitude shorter than the lifetime of the upper laser level. Thus, the corresponding Q-switching pulse frequency is two orders of magnitude higher than that believed to have been attained heretofore.

Advantageously, the Q-switching according to my invention can be achieved without introducing additional loss into the resonant cavity. Specifically, the effective optical length of the cavity is varied by approximately one-half wavelength of the laser radiation during each pulse period. The Q-switching in such specific embodiments of the invention might appropriately be termed reactive Q-switching.

In one specific embodiment of the invention, reactive Q-switching of a carbon dioxide laser oscillating at 10.6 microns has been obtained at frequencies from 20 kilocycles per second to 60 kilocycles per second. Since the lifetime of the lower laser level is approximately $3 \times 10^{-5}$ seconds, the frequency having a period approximately equal thereto is 33 kilocycles. I generalize this result to conclude that the operative range of pulse periods for Q-switching according to my invention extends approximately from $\tau_{L/2}$ to $2\tau_L$, where $\tau_L$ is the lifetime of the lower laser lever of the particular vibrational-rotational transition upon which lasing action occurs.

Moreover, the invention should in principle be applicable to all lasers operating upon a vibrational-rotational type of transition in a molecular gas system.

An important aspect of reactive Q-switching in such a molecular gas system resides in the relatively great pulse width in relation to pulse period that is provided, in comparison to pulse widths for typical saturable absorber and rotating mirror Q-switching arrangements. The relatively great pulse widths permit thermalization of the rotational energy levels within each one of the vibrational states associated with the upper and lower laser levels and thereby provide a higher average power output than heretofore. The average power output approximates the continuous-wave power output.

The thermalization occurs during the existence of each pulse to an extent sufficient to channel available lasing power into one oscillating transition to the exclusion of other transitions that would otherwise also oscillate. Thermalization, as used herein, is the energy transfer between the rotational energy levels of a single vibrational energy state which tends to establish a Maxwellian distribution of the populations of those rotational energy levels.

Various other features and advantages of the present invention will become apparent from the following detailed description, taken together with the drawing, in which:

FIG. 1 is a partially pictorial and partially block diagrammatic illustration of a preferred embodiment of the invention;

FIG. 2 shows curves that are useful in explaining the theory and mode of operation of the invention; and FIGS. 3, 3A, 4, 4A, 5 and 6 are partially pictorial and partially block diagrammatic illustrations of modifications of the embodiment of FIG. 1.

In the embodiment of FIG. 1, there is shown an external-mirror carbon dioxide laser Q-switched according to my invention. The laser comprises a glass tube 11, which contains a gaseous mixture of nitrogen, supplied from a source 12, and carbon dioxide, supplied from a source 13. The tube 11 is closed at its ends by Brewster-angle plates 14 and 15 of potassium chloride, which are transparent at the laser wavelength of 10.6 microns.

Pumping energy is supplied to the gaseous mixture by an electrical discharge between the cold cathode 18 and the anode 19, powered by a direct-current voltage source 20. The cathode 18 and anode 19 are disposed in bulbous appendages 21 of the tube 11.

Beyond the Brewster-angle plates 14 and 15, the focusing reflectors 22 and 23 are disposed to form an optical resonator. For 10.6 micron laser radiation, the reflector 23 is typically coated with vacuum-deposited gold to be opaque; and the reflector 22 is dielectric coated, by techniques now well known in the art, to be about 90 percent reflective and 10 percent transmissive to couple the output laser radiation from the laser. The reflector 23 is mounted upon the piezoelectric crystal 24, which is adapted to move the reflector 23 back and forth along the laser axis. The crystal 24 is driven by an electrical signal applied through the transducer 25 from the switching signal source 26.

The period of the switching signal from source 26 is illustratively twice the lifetime of the lower laser level and its amplitude is half a wavelength of the laser radiation. More generally, the period of the signal from source 26 may lie in any of the ranges of values such that it is greater than N times the lifetime of the lower laser level and is less than 4 N times the lifetime of the lower laser level, where N is a positive integer. The peak-to-peak amplitude of the axial movement of mirror 23 should then be substantially the same integer, N, times a half wavelength of the laser radiation.

The tube 11 illustratively has a bore of 10 millimeters and provides an effective discharge length of 50 centimeters along its axis. Nevertheless, the tube 11 can be of any known type so long as its end windows are substantially transparent to the laser radiation. It illustratively contains a static gas mixture, since the valve 16 normally shuts off inlet apparatus 17 during operation; nevertheless, it could also be provided with a gas exhaust, so that the gas mixture may be continuously flowed through the discharge region. Also, tube 11 may be adapted to contain internal mirrors forming the optical resonator.

Illustratively, the gas mixture within the tube 11 comprises carbon dioxide at a pressure of about 4 torr and nitrogen with a pressure of about 4 torr. It may include additives as disclosed in the copending application of C. K. N. Patel, Ser. No. 474,546, filed July 26, 1965, and Ser. No. 495,844, filed Oct. 14, 1965, both assigned to the assignee hereof. The carbon dioxide pressure can vary from about 0.05 torr to 10 torr; and the nitrogen pressure can vary from about 0.1 torr to nearly 20 torr. It is specifically to be noted that certain additives such as water vapor or denturium oxide, change the time constant of the lower laser level and thereby can provide a corresponding adjustment or control of the frequency range in which Q-switching can be obtained according to my invention.

Moreover, the lasing gas component may be some molecular gas other than $CO_2$. For example, it could also be $N_2O$, preferably employed with $N_2$ as an auxiliary gas.

Illustratively, pump power is supplied from source 20 at a current of about 6 milliamperes and at a voltage of about 8 kilovolts between electrodes 18 and 19. It is understood that these values depend on tube size and, for any given tube, can vary through a considerable range. Although direct-current pumping is shown, other means could be employed for supplying pump energy to the gas mixture to sustain a population inversion. If pulsed pumping is used, it preferably is synchronized with source 26 so that maximum population inversion coincides with optimum resonating conditions of the optical resonator.

The reflectors 22 and 23 that form the optical resonator are preferably spaced near-confocally, although a near-concentric or other arrangement could be employed. Reflector 23 also could be dielectric coated, by techniques now well known in the art, for maximum reflectance at the wavelength of the laser radiation, e.g., 10.6 microns. Reflector 22 could be coated with vacuum-deposited gold and provided with a coupling aperture in the center, illustratively with a diameter of two millimeters, although its size would depend on the size of tube 11 and the pumping power level. Also, the resonator could be formed as a ring and could employ three or more reflectors. As mentioned above, reflectors 22 and 23 could be replaced with mirrors within tube 11.

The reactive modulation of the resonator that is produced by the axial oscillation of mirror 23 could also be advantageously achieved with a constant-velocity axial motion of the mirror over a limited range. Operation of such an embodiment will be briefly described hereinafter. The reactive Q-switching can also be produced by a variety of other arrangements, some of which will be described hereinafter. The variable loss type of Q-switching can also be employed to practice the present invention.

The operation of the preferred embodiment of FIG. 1 will now be described with reference to FIG. 2. For the purposes of comparison, FIG. 2 shows three regimes of operation: prior art type Q-switching, continuous-wave oscillation, and rapid Q-switching according to the present invention, all as functions of time. The upper set of curves show the typical outputs obtained, the next two lower sets of curves show the relative populations of the upper and lower laser levels, in that order.

It will be noted, the time constant, or lifetime of the upper laser level, as illustrated by the slowly rising exponential portion of curve 34, is substantially longer than the time constant, or lifetime, of the lower laser level, as illustrated by the rapidly falling exponential portion of curve 37.

It had previously been thought that the minimum Q-switching period, corresponding to maximum pulse rate, for a molecular laser such as the carbon dioxide laser was approximately the lifetime of the upper laser level, i.e., about $1 \times 10^{-3}$ seconds. A single pulse 31 would be obtained during such a period; and the upper laser state would be given sufficient time to recover its maximum population.

In the operation of the present invention, the changing condition of the optical resonator produced by the motion of reflector 23 promotes the start of a new laser pulse as soon as the population of the lower laser level has substantially recovered, as can be seen by viewing curves 33 and 39 in relationship to each other.

Particular reference is made to curve 36, which shows that the population of the upper laser level does not vary substantially between pulses. There is not sufficient time for it to vary substantially. As a result, the population of the upper laser level is approximately the same as it would be during continuous-wave oscillation, as shown by curve 35.

For purposes of illustration, assume that the peak-to-peak motion of reflector 23 includes one half wavelength of the laser radiation and that its period is twice the lifetime of the lower laser level. During each complete oscillation, the reflector 23 twice provides optimum resonating conditions of the mirror, at the extreme limits of its motion, and two pulses will be obtained. Thus, the period of the pulses is equal to the lifetime of the lower laser level. The amplitude and period of the motion of reflector 23 can be multipled by a factor N with similar results. In any such case, 2 N pulses are produced during each oscillation; and the lower laser population undergoes substantial recovery between pulses. While preferred conditions are described, the period of oscillation of reflector 23 can be varied in a range about each preferred value. In general symbolic terms, $$N\tau_L < T_{REF.} < 4N\tau_L \qquad (1)$$

and $$\Delta Z_{REF} \approx N\lambda/2 \qquad (2)$$

where $\Delta Z_{REF}$ is the peak-to-peak axial variation of resonator optical path length produced by the reflector motion, $\tau_L$ is the lifetime of the lower laser level, N is an integer, $\lambda$ is the laser wavelength, and $T_{REF}$ is the period both of the motion of reflector 23 and of the signal source 26. The number of pulses produced per cycle is 2 N.

One characteristic of the present invention cannot readily be described by reference to curves 33, 36 and 39 of FIG. 2. That characteristic is the role of thermalizing collisions between molecules respectively occupying different rotational energy levels within one vibrational state. These collisions increase the total amount of energy obtained in each of the pulses of curve 33 and simultaneously serve to limit oscillation to one laser line, typically the strongest one.

The upper laser level is typically one rotational energy level among many in a particular vibrational state; and the lower laser level is typically one rotational energy level among many in a different vibrational state. Thermalizing collisions are a type of collision that tends to average the energy of the colliding particles and thus to give a Maxwellian energy distribution of population among the differing rotational energy levels of a particular vibrational state. Such collisions occur either directly between molecules occupying differing rotational energy levels within the same vibrational state, or indirectly through a plurality of collisions of the two molecules with intermediate particles. The thermalizing time constant in the carbon dioxide laser of FIG. 1 is about $1 \times 10^{-7}$ seconds, although it is pressure-dependent.

During the existence of each of the output pulses shown in curve 33 of FIG. 2, the population of molecules in the rotational energy level that is the upper laser level rapidly decreases. Within the lapse of $1 \times 10^{-7}$ seconds, molecules in adjacent rotational energy levels in the same vibrational state have moved into the rapidly depleting level by means of thermalizing collisions. It is understood, of course, that all such molecules have not only rotational energy, but also the vibrational energy characteristic of the vibrational energy state in which they are present. In thus counteracting the population depletion produced by the laser pulse, they contribute power to the strongest laser line. This power would otherwise have been available to sustain laser oscillation on a plurality of lines.

Similarly, the population of molecules in the rotational energy level that is the lower laser level rapidly increases. Within the lapse of $1 \times 10^{-7}$ seconds, substantial numbers of molecules that arrived at that level by means of the laser transition from the upper laser level have moved into rotational energy levels adjacent the lower laser level within the same vibrational state by means of thermalizing collisions. In this counteracting the population increase of the lower laser level, as produced by the laser pulse, they also contribute to the strongest laser line additional power that would have been available to sustain laser oscillation on a plurality of lines.

As a result, the average power output of the Q-switched laser is as great as it is during continuous-wave oscillation.

This surprising result has been obtained with an arrangement somewhat modified from that of FIG. 1. The mirror 23 was moved at constant velocity by a motor-driven wire and pulley arrangement. This arrangement changed the optical path length of the resonator by one-half wavelength at rates ranging from 20,000 times per second to 60,000 times per second in different runs. These frequencies correspond to periods from 50 microseconds down to 16 microseconds, as compared to the 30 microsecond lifetime of the lower laser level. Moreover, only a single line oscillated (the so-called P20 transition); and only one mode oscillated within that line, despite the lack of frequency-selecting and mode-selecting devices within the optical resonator.

Similar results should be obtainable from the preferred embodiment of FIG. 1, which is better adapted for easy manufacture and commercial use than is the experimental embodiment described above.

Moreover, the sinusoidal variation in velocity provided by the embodiment of FIG. 1 causes the reflector 23 to dwell longer at the positions of optimum resonance of the resonator, thereby providing a relatively longer pulse and somewhat more efficient thermalizing energy transfer to the oscillating laser line than the last described embodiment. It is believed that the operative range of pulse periods, from leading edge to the next leading edge, should range from about 15 microseconds to about 60 microseconds, that is, from half to twice the lifetime of the lower laser level.

It should be noted that both the embodiment of FIG. 1 and the modified embodiment described above provide a ratio of pulse duration to pulse period that is much greater than the rotating mirror, variable loss-type Q-switching arrangements. This difference can be understood by considering the fact that in the prior art arrangement the resonator Q falls rapidly for extremely small deviations of the focus of a reflector from the laser axis.

It is possible to produce the required oscillation in the effective optical path length of the resonator without repeatedly accelerating a reflector to reverse its motion along the laser axis. An arrangement eliminating the axial accelerations is illustrated in FIG. 3.

In the embodiment of FIG. 3, most of the components are the same as the like-numbered components of FIG. 1.

In place of reflector 23 of FIG. 1, there is employed a reflector 43 having a plurality of ripples or undulations in its reflective surface. As shown in the front view, FIG. 3A, the ripples radiate from a central point of the reflective surface of reflector 43 and have alternate peaks 46 and valleys 47 evenly spaced circumferentially around the reflector. The diameter of reflector 43 is more than twice, and preferably about four times, the internal diameter of the tube 11; and the central point of the reflector 43 is offset from the laser axis by more than the radius of tube 11.

A shaft 45 connects to the back side of reflector 43 directly opposite the central point to provide a rotation axis extending through the central point. The shaft 45 is supported and turned by the servomotor 44, so that the peaks and valley of adjacent ripples successively intersect the laser axis to form the optical resonator, together with reflector 22.

The depth of the ripples of reflector 43 is not critical, in view of the fact that the peaks of the ripples tend to defocus the laser light and thus inhibit oscillation. Optimum resonating conditions recur whenever the valley of each ripple passes through the laser axis. If each pair of a peak and valley is considered as one ripple, and if there are M ripples in the reflector 43, then the period of each revolution of servomotor 44 and mirror 43 should be greater than $M\tau_{L/2}$ and less than $2M\tau_L$, where $\tau_L$ is the lifetime of the lower laser level. With this condition satisfied, the operating conditions of the embodiment of FIG. 3 are directly analogous to those of the embodiment of FIG. 1.

The primary differences between the embodiments of FIGS. 3 and 1 reside in the substitution of rotational motion for reciprocal motion, respectively, and in the fact that the optimum resonance condition in the embodiment of FIG. 3 corresponds to a lower Q than the optimum resonance condition of the embodiment of FIG. 1. The latter fact results from the generally cylindrical shape of the effective reflecting surface formed by each of the valleys of the ripples in reflector 43. A cylindrical shaped reflector is less effective than a spherically shaped one in refocusing the laser light back into the active gas within tube 11; and "walk-off," or diffraction, losses tend to occur through the side walls of tube 11 in directions that form a common plane with the axis of the cylindrical reflective element.

A modification of the embodiment of FIG. 3 is illustrated in FIG. 4.

In the modified embodiment of FIG. 4, the rippled reflector 43 of FIG. 3 is replaced by a fixed spherically curved reflector 63 and a rotatable phase-shifting plate 53, which has ribs radiating from a central point and providing successive steps of differing phase shifts for the laser light as the ribs pass through the path of the laser light. The raised flat portions 58 of the ribs have lateral dimensions identical to the depressed portions 59 between them, as shown in FIG. 4A.

The phase shift plate 53 comprises potassium chloride or other material transparent at 10.6 microns and is disposed within the optical resonator formed by reflectors 22 and 63 with its center or rotation axis offset from the laser axis as by more than the radius of tube 11. It is oriented at the Brewster angle with respect to the path of the laser light in order to minimize the losses caused by it. Shaft 55 and servomotor 54 provide rotation of plate 53 about an axis passing through its center point.

Each step of optical path length variation provided by plate 53 is sufficiently close to an integral multiple number N of wavelengths that a pulse can occur whenever two different rib portions are not disposed within a cross-section of the laser beam. Thus, the pulse duration to pulse period ratio can be selected by selection of the width of the raised and depressed portions of the ribs. Since pulses occur both when a single raised portion intercepts the laser beam and when a single depressed portion intercepts the laser beam, the period $T_{REV}$ of each revolution of plate 53 and servomotor 54 is selected to satisfy the following condition:

$$M\tau_{L/2} < T_{REV} < 2M\tau_L \qquad (3)$$

where M is the number of raised portions 58 plus the number of depressed portions 59, since a laser pulse is resonated with each portion. It is noted that the integer N, the number of half-wavelengths in a step change of path length, does not enter into this relationship because the step change in optical path length does not pass through intermediate values of the path length. During the time that a raised rib portion 58 and a depressed rib portion 59 simultaneously intercept the laser beam, the resulting interference between the respective portions of the beam effectively suppress oscillations.

The embodiments of FIGS. 5 and 6 differ from the embodiment of FIG. 4 in that an acousto-optic cell and an electro-optic cell, respectively, provide the means for varying the optical path length of the resonator at the rate characteristic of the invention. Components that are the same as in FIG. 4 are identified with the same numbers.

In the embodiment of FIG. 5, the acousto-optic cell comprises a crystal 74 of a photoelastic semiconductive material, such as germanium, that is transparent at the wave length of the laser radiation and suitable transducer means 75 for generating an acoustic wave in response to the signal from switching signal source 76. The crystal 74 is oriented at the Brewster-angle with respect to the laser beam. At the light wavelengths of interest, a useful acoustic wavelength in the crystal 74 is typically of the order of 10 centimeters. This value makes it convenient to pass the laser beam through the cell at a point of maximum pressure.

Accordingly, the crystal 74 is adapted to be one acoustic wavelength long in the direction of acoustic wave propagation; and a reflecting termination is used. The resulting standing wave produces a pressure maximum in the center of crystal 74. Because of the photo-elastic effect, the refractive index and hence the optical path length varies periodically at the acoustic frequency.

The amplitude of the signal from source 76 is selected to provide a peak-to-peak variation in the optical path length of an integral multiple number of half-wavelengths of the laser radiation; and the period of the switching signal is selected according, as described in Equation 1 above in reference to the embodiment of FIG. 1, in which $T_{REF}$ is replaced by the period of the signal from source 76.

In the embodiment of FIG. 6, the electro-optic cell comprises the crystal 84 of an electro-optic material, such as gallium arsenide or cadmium sulfide, that is transparent at the wavelength of the laser radiation and suitable electrode means 85 for applying an electric field to the crystal in response to the signal from the switching signal source 86. The major faces of the crystal 84 through which the laser beam passes are oriented at the Brewster angle.

The signal from source 86 is pulsed to provide a variation in effective optical path length that is analogous to the step-wise variation occurring in the embodiment of FIG. 4. The half-period of the signal is greater than half the lifetime of the lower laser level and less than twice the lifetime of the lower laser level. Alternatively, a sinusoidal signal variation of amplitude and frequency as described for the embodiment of FIG. 5 could be employed.

It should be apparent that alternative techniques can be devised to employ the principles of cooperation of the present invention. For example, loss modulation of the laser resonator instead of reactive modulation could be employed if the optimum resonance condition recurs at the appropriate interval, not less than half, nor more than twice, the lifetime of the lower laser level. Moreover, while thermalizing energy transfer during each pulse is preferred, it is believed not to be a necessary feature of the present invention. It should be apparent that a great variety of other gas lasers can be Q-switched by employing the principles of the present invention.

What is claimed is:

1. A pulsed laser comprising means forming an active region including a molecular gas capable of lasing action upon a transition between rotational energy levels of differing vibrational states thereof, means for supplying pump energy to said molecular gas to promote said lasing action, means for resonating energy produced by said lasing action, and means for changing a condition of said resonating means to provide optimum resonance at time intervals that are larger than half the lifetime of the lower laser level and less than twice the lifetime of the lower laser level.

2. A pulsed laser according to claim 1 in which the condition changing means comprises means for changing the effective optical path length of the resonating means non-linearly with respect to time.

3. A pulsed laser according to claim 1 in which the condition changing means comprises means for changing the effective optical path length of the resonator to sustain the laser pulse during each time interval for a period comparable to or greater than the thermalization time constant of the differing rotational energy levels within one of said vibrational states.

4. A pulsed laser according to claim 1 in which the resonating means includes a reflector and the condition changing means comprises a piezoelectric mount for said reflector and means for driving said piezoelectric mount to oscillate said mirror with an amplitude and a frequency to provide the optimum resonance condition at time intervals that are larger than half the lifetime of the lower laser level and less than twice said lifetime.

5. A pulsed laser according to claim 4 in which the driving means oscillates said mirror with a peak-to-peak amplitude approximately equal to an integral multiple number of half-wavelengths of the laser radiation and with a period between one and four times said integral multiple number times the lifetime of the lower laser state.

6. A pulsed laser according to claim 1 in which the resonating means includes a reflector having a number of evenly spaced ripples, and in which the condition-changing means comprises means for moving said reflector to position successive different valleys of said ripples in the path of the laser radiation.

7. A pulsed laser according to claim 1 in which the condition-changing means comprises a phase-retardation plate having a number of evenly spaced ribs providing steps of phase retardation differing successively by an integral number of half-wavelengths of the laser radiation and means for moving said plate to provide successive ones of said differing steps of phase retardation in the path of the laser radiation.

8. A pulsed laser according to claim 7 in which the moving means comprises means for providing a rotational axis for the phase-retardation plate offset with respect to the path of the laser radiation and means for rotating said phase-retardation plate about said axis in a period per revolution that is greater than half said number of steps times the lifetime of the lower laser state and less than twice said number of steps times the lifetime of said lower laser state.

9. A pulsed laser according to claim 1 in which the condition-changing means comprises an acoustic or electro-optic cell and means for electrically driving said cell to provide a peak-to-peak variation in optical path length of the resonating means that is an integral multiple number of half-wavelengths of the laser radiation.

10. A pulsed laser according to claim 1 in which the molecular gas is carbon dioxide and the condition changing means includes a signal source driving said condition changing means to provide optimum resonance at time intervals ranging from 16 microseconds to 50 microseconds.

References Cited

UNITED STATES PATENTS

| | | | |
|---|---|---|---|
| 3,299,368 | 1/1967 | Klebba | 331—94.5 |
| 3,339,073 | 8/1967 | Hunter | 331—94.5 X |

OTHER REFERENCES

Hargrave, L. F., Fork, R. L., and Pollack, M. A.: "Locking of He Ne Laser Modes Induced by Synchronous Modulation," Applied Physics Letters, vol. 5, No. 1, July 1, 1964, pp. 4–7.

RONALD L. WIBERT, Primary Examiner

T. MAJOR, Assistant Examiner

U.S. Cl. X.R.

332—7.51